United States Patent [19]

Bergens

[11] 4,143,753

[45] Mar. 13, 1979

[54] CONVEYING ARRANGEMENT

[76] Inventor: Torsten E. Bergens, Lessebovägen 122, S-122 47 Enskede, Sweden

[21] Appl. No.: 669,122

[22] Filed: Mar. 22, 1976

Related U.S. Application Data

[63] Continuation of Ser. No. 177,416, Sep. 2, 1971, abandoned, which is a continuation-in-part of Ser. No. 120,666, Mar. 3, 1971, abandoned.

[30] Foreign Application Priority Data

Mar. 3, 1970 [SE] Sweden ............................... 2764/70

[51] Int. Cl.² .............................................. B65G 43/00
[52] U.S. Cl. .................................... 198/370; 198/515;
198/518; 198/608; 198/624
[58] Field of Search ................. 198/9, 25, 36, 82, 108,
198/167, 212, 209, 211, 219, 76, 109, 358, 362,
366, 369, 370, 480, 512, 518, 608, 624, 722, 803,
570, 514, 515, 611; 214/1 P; 271/64, 189; 37/64;
418/196, 206; 299/46, 59, 71

[56] References Cited

U.S. PATENT DOCUMENTS

| 1,012,046 | 12/1911 | Anderson | 198/127 |
|---|---|---|---|
| 2,571,084 | 10/1951 | Yarmak | 198/515 |
| 2,793,736 | 5/1957 | Thomson | 198/127 |
| 2,848,845 | 8/1958 | Doumont | 198/76 |
| 3,189,161 | 6/1965 | Schneider et al. | 198/127 |
| 3,651,922 | 3/1972 | Ross et al. | 198/127 |

FOREIGN PATENT DOCUMENTS

| 237053 | 9/1924 | Fed. Rep. of Germany | 198/108 |
|---|---|---|---|
| 1207412 | 2/1960 | France | 198/212 |

Primary Examiner—Joseph E. Valenza
Attorney, Agent, or Firm—Fred Philpitt

[57] ABSTRACT

This invention pertains to an arrangement for conveying, handling and storing of solid bodies, bulk material, jelly products or liquids, which arrangement characterized by a plurality of rotary shafts arranged at a distance apart from each other, each of said shafts being equipped with one or more cams, the distance between adjacent shafts being approximately equal to or greater than the length of the cams.

1 Claim, 24 Drawing Figures

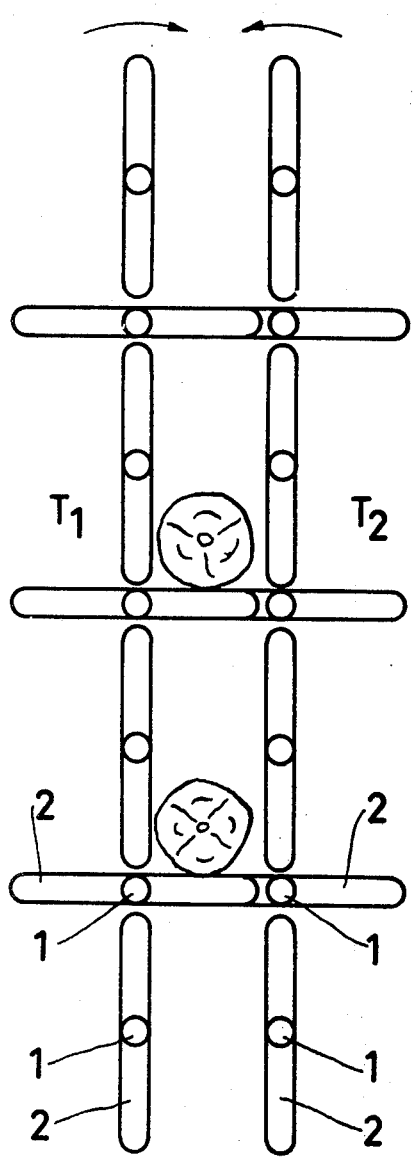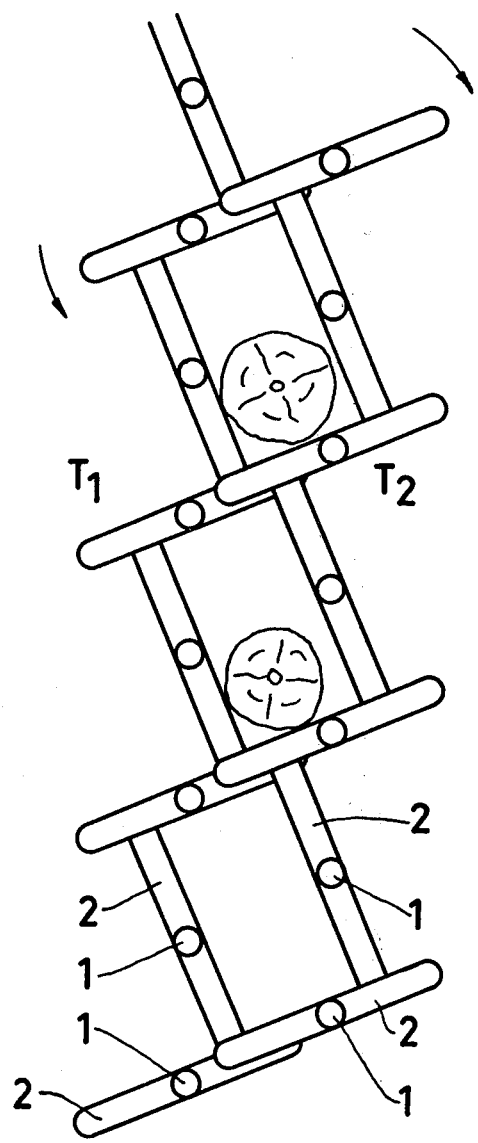

FIG.10
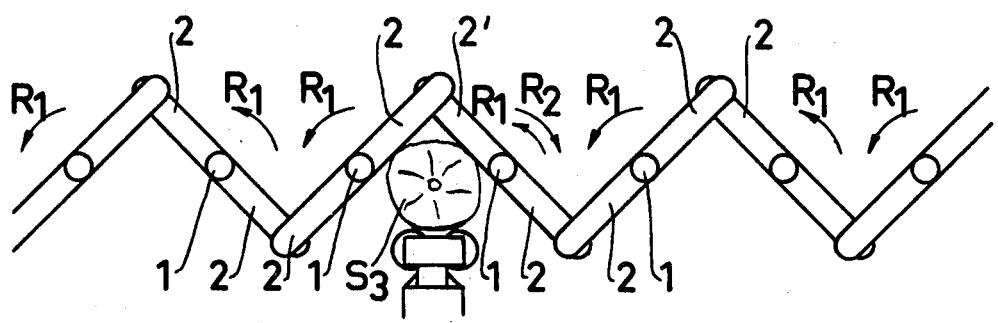
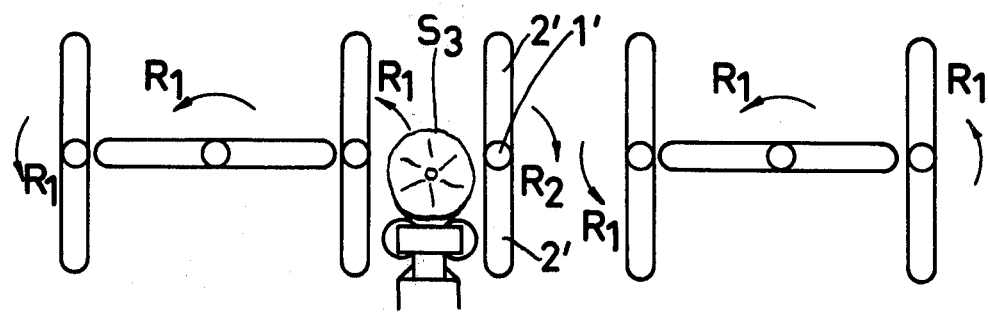
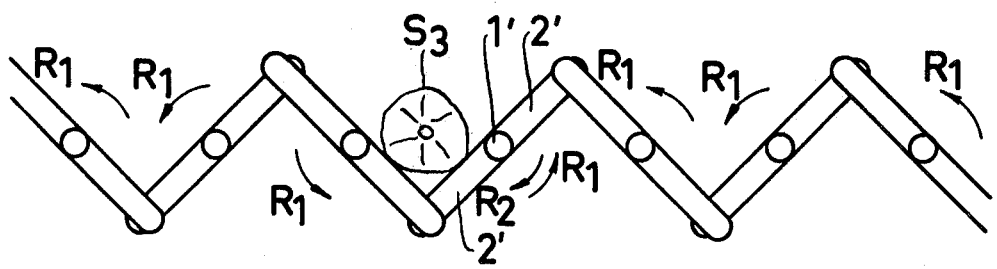

FIG. 17
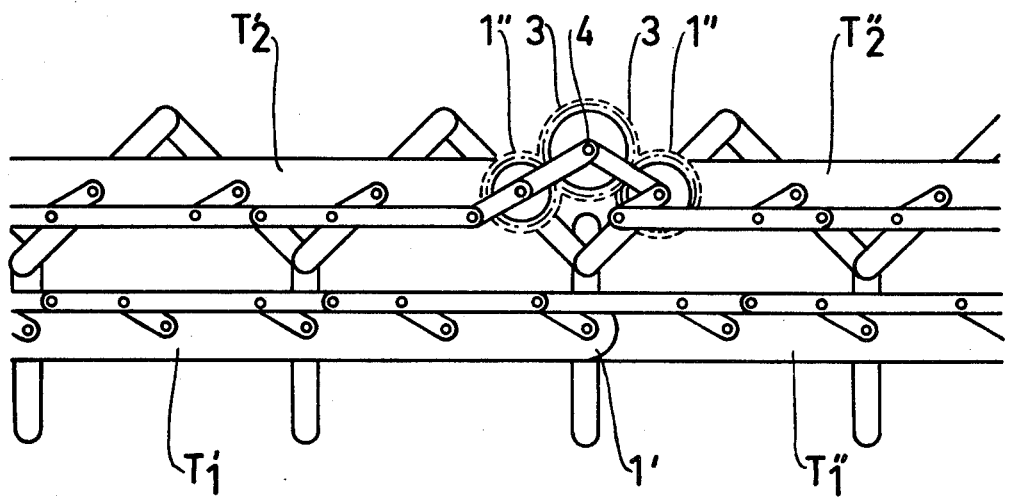
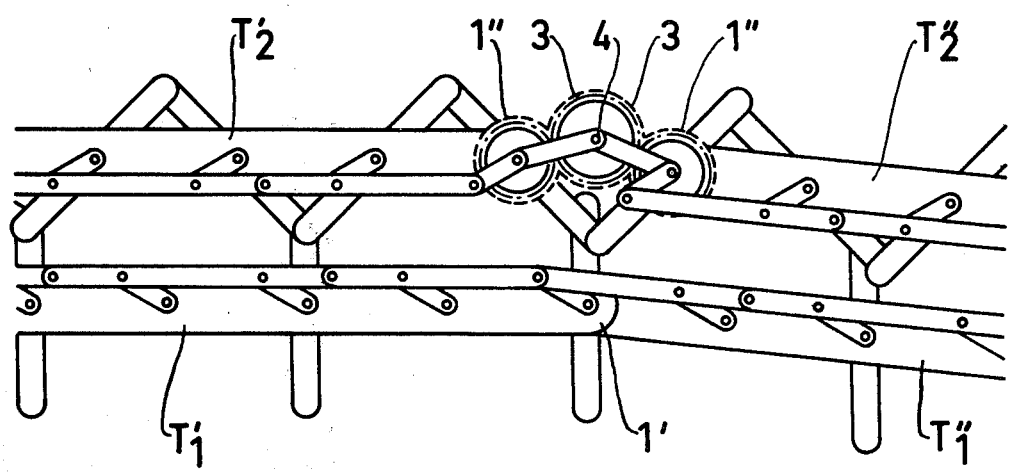

FIG. 18
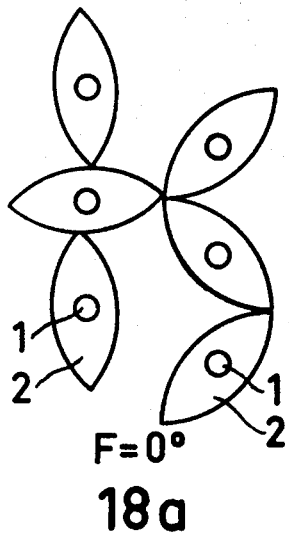
F=0°
18a
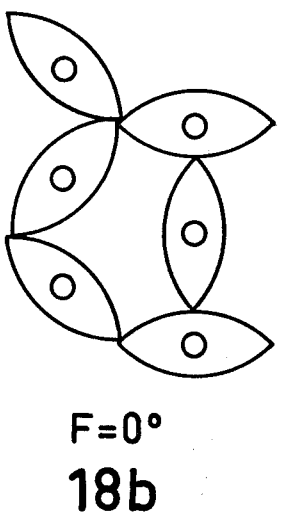
F=0°
18b
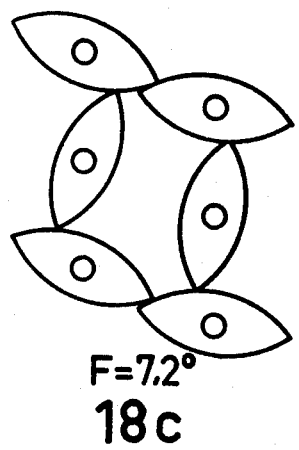
F=7.2°
18c
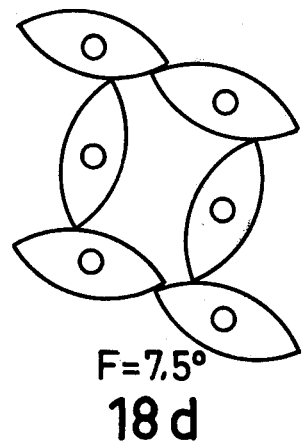
F=7.5°
18d
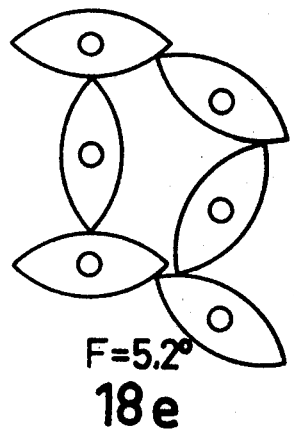
F=5.2°
18e
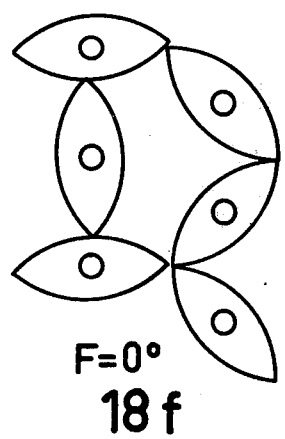
F=0°
18f

CONVEYING ARRANGEMENT

This application is a continuation of Ser. No. 177,416 filed Sept. 2, 1971 now abandoned which was a continuation-in-part of Ser. No. 120,666 filed Mar. 3, 1971 now abandoned.

THE PRESENT INVENTION

This invention relates to an arrangement for conveying, handling and storing solid bodies, bulk material, jelly products and liquids. In many industrial activities, conveying, handling, and storing is time-consuming and expensive. A high degree of automation is desirable, but the prior art does not teach any arrangement by means of which it is possible to build up highly automated systems for conveying, handling and storing of solid bodies, bulk material, jelly products or liquids. Such systems are achievable according to the present invention.

The invention may be used wherever it is desirable to efficiently convey, handle or store solid bodies, bulk material, jelly products or liquid, such as in sawmill industries, in the engineering industries, distributing companies, and road construction companies. The solid bodies may have any form and shape, and the bulk material may be of various kinds, such as wood chips, gravel or granulated material.

Figure 3:
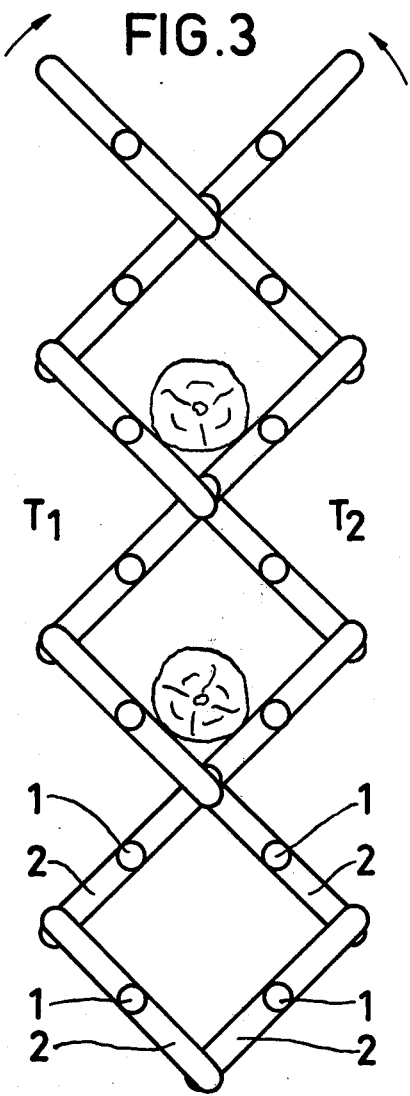
Figure 4:
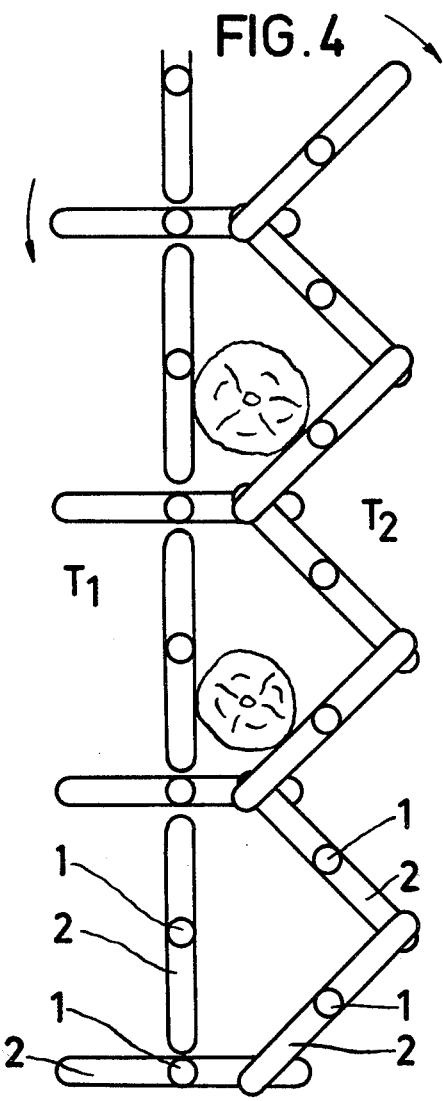
Figure 7:
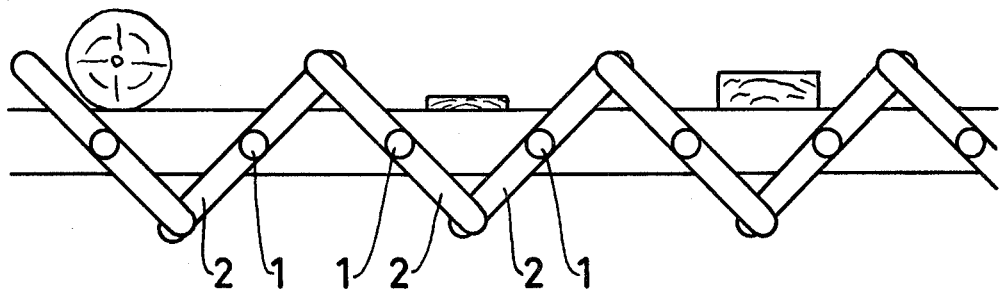
Figure 8:
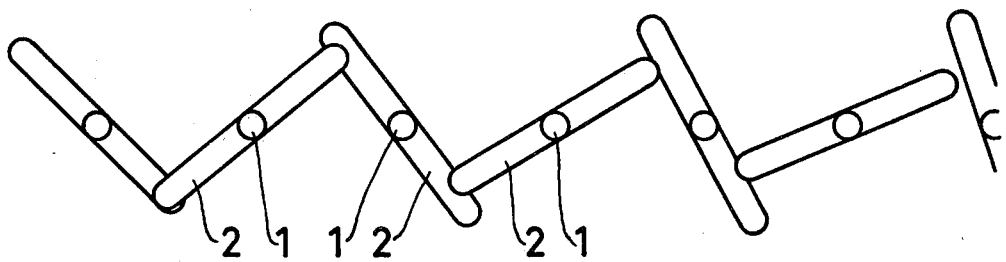
Figure 9:
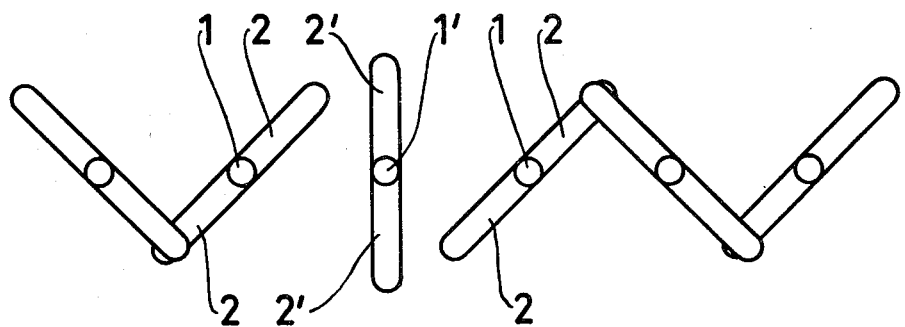
Figure 11:
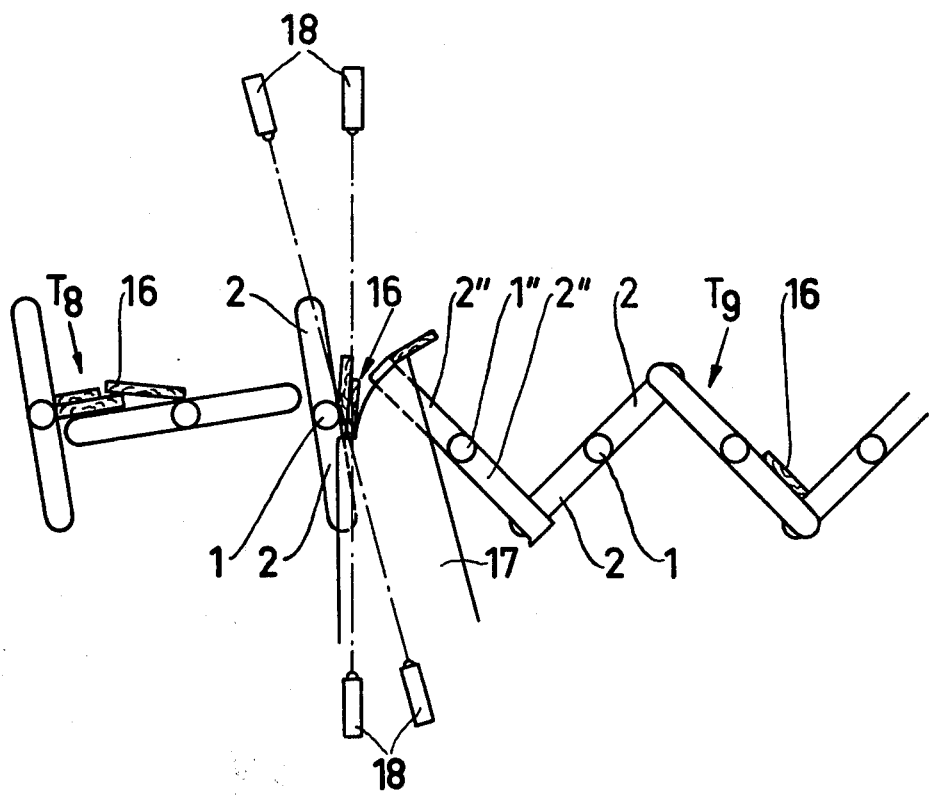
Figure 12:
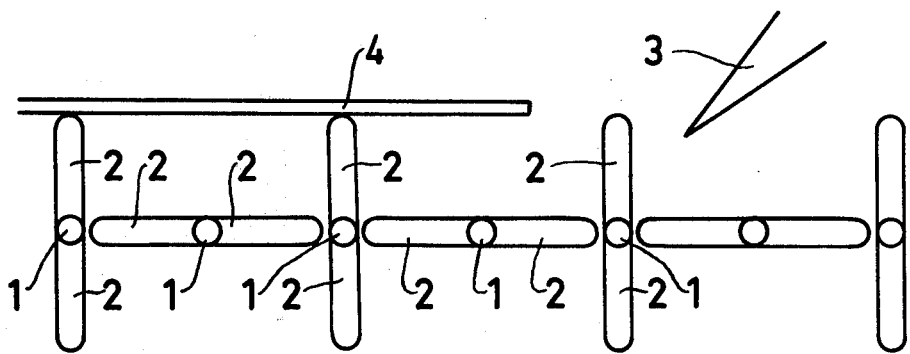
Figure 13:
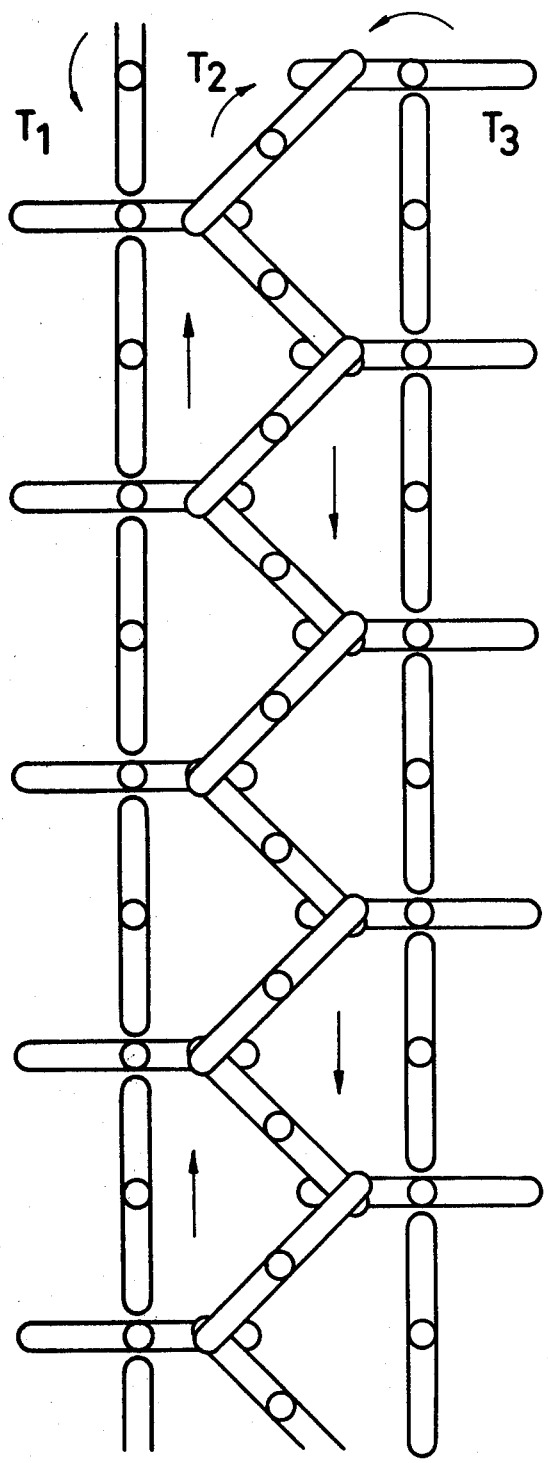
Figure 14:
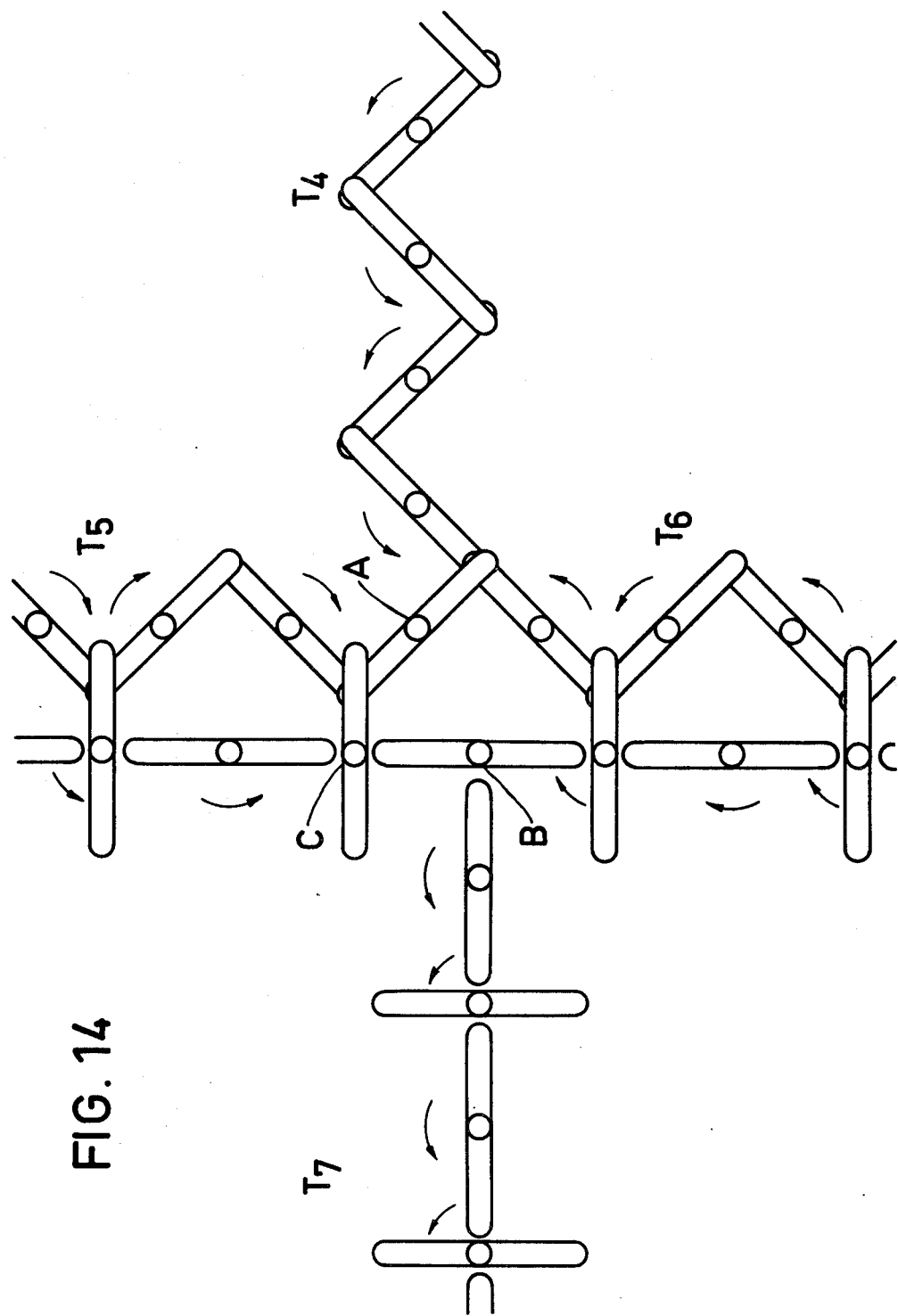
Figure 15:
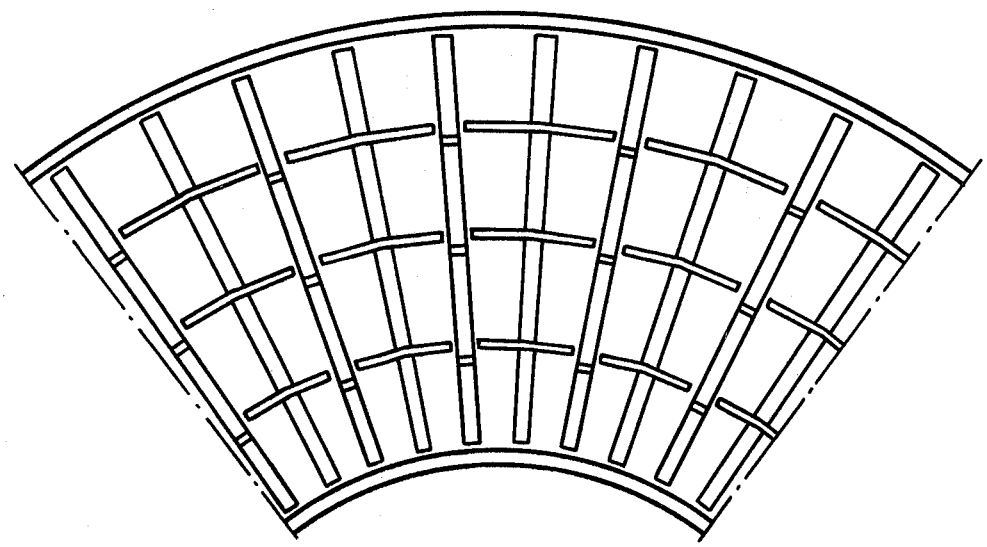
Figure 16:
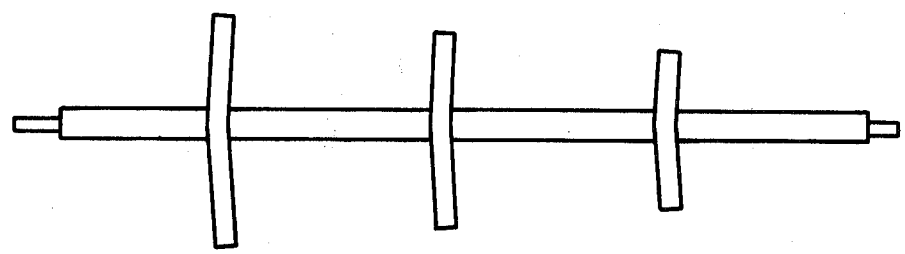
Figure 19:
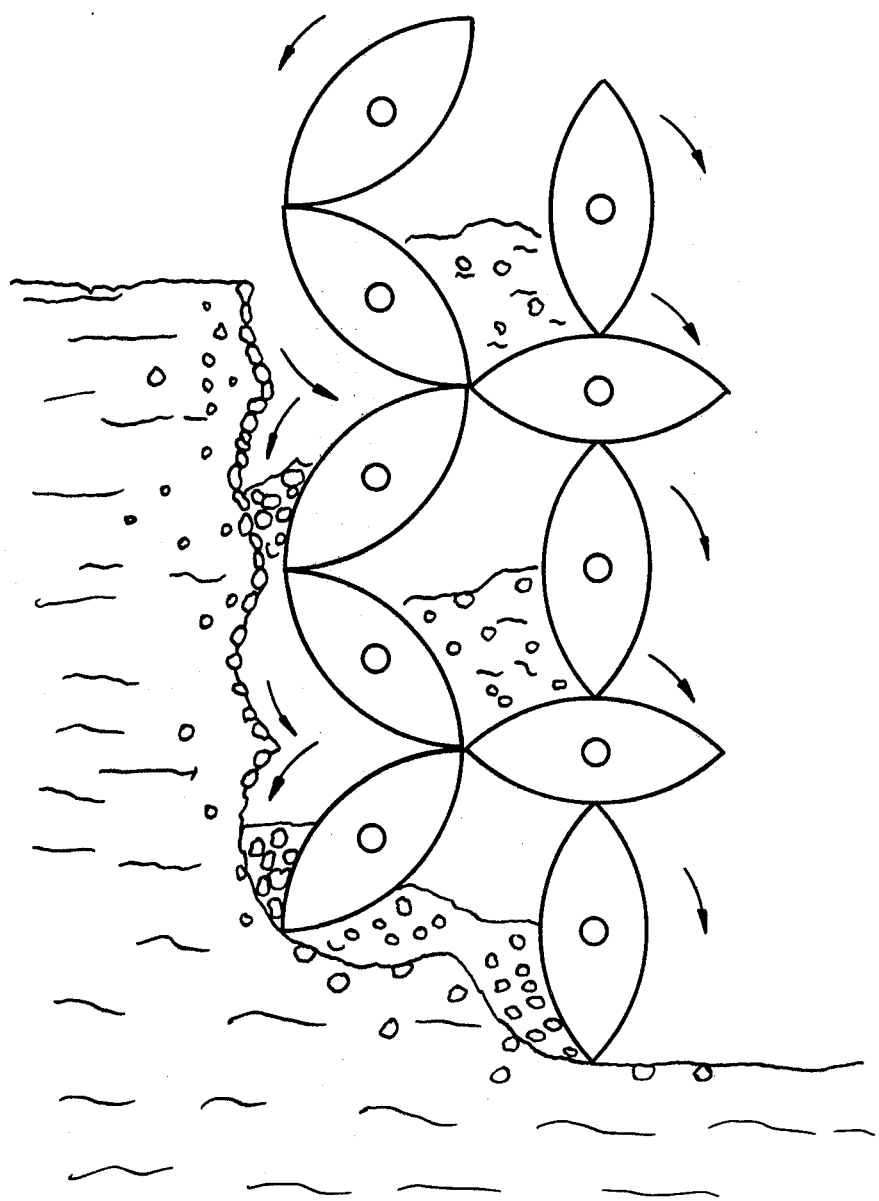

FIGS. 3 and 4 each shows a conveyor according to the invention in which handled objects are conveyed in closed spaces;

FIGS. 5 and 6 show the conveyors of FIGS. 3 and 4, respectively, at a later stage of operation;

FIGS. 7 and 8 each schematically shows an embodiment having increased power efficiency;

FIG. 9 is a schematic view of one embodiment performing separation of the handled material;

FIG. 10 is a sequence of schematic views showing operation during a pick-up operation;

FIG. 11 is a schematic view of a single object feeding embodiment;

FIG. 12 is a schematic view of an embodiment including means for the automatic straightening of objects conveyed;

FIG. 13 shows a multiple conveyor according to the invention;

FIG. 14 shows an arrangement at a junction between several handling devices;

FIG. 15 is a top view of an angular conveyor according to the invention;

FIG. 16 is a top view of a shaft of the conveyor of FIG. 15;

FIG. 17 is a side view of a bendable or hinged conveyor according to the invention;

FIG. 18a-f shows schematically the operation sequence of a bulk material conveyor according to the invention; and FIG. 19 is a schematic side view of a bulk material conveyor which simultaneously performs digging.

Figure 1:
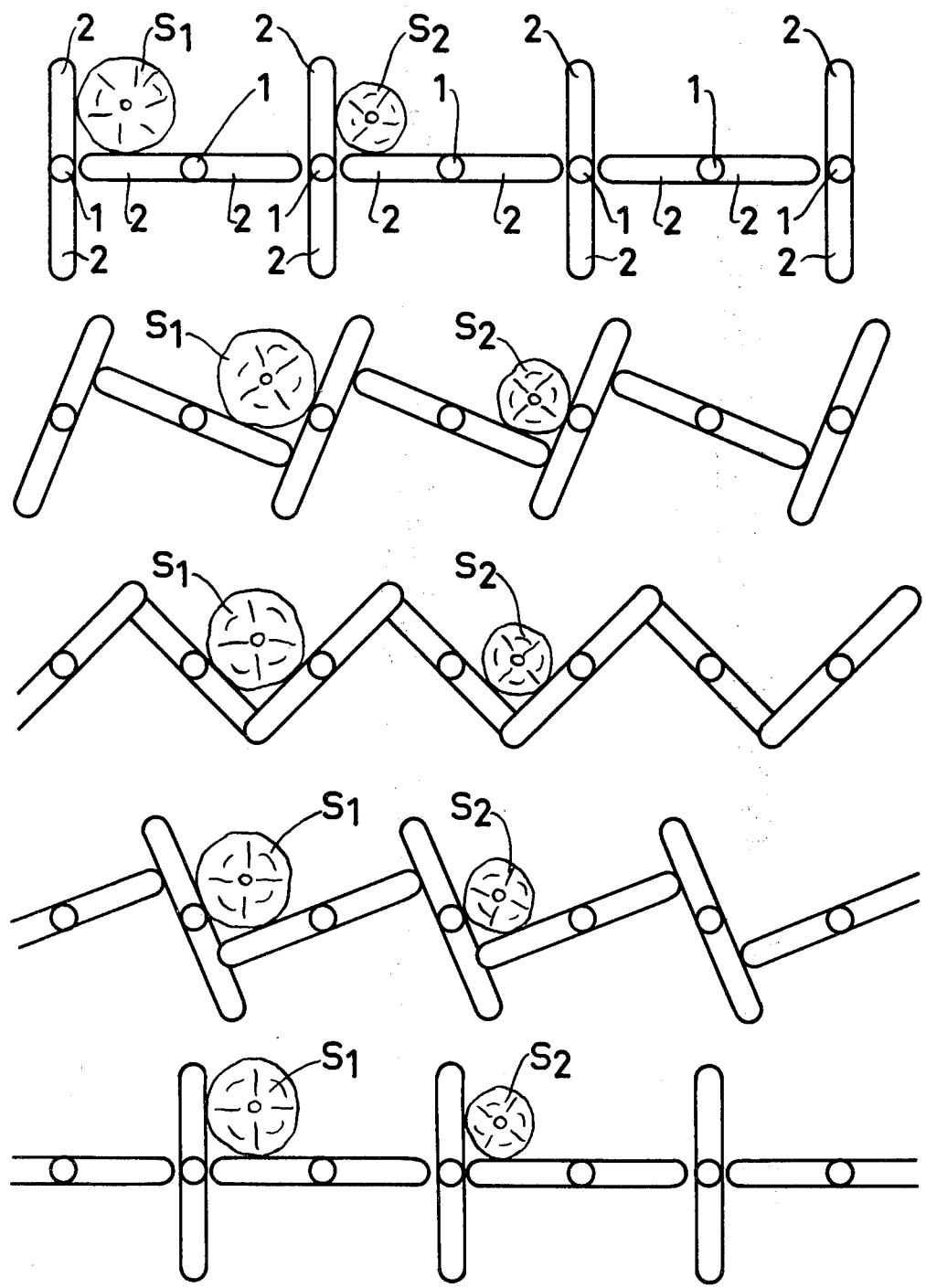
FIG. 1 shows schematically from a side view a conveyor according to the invention in different operating phases during its conveying action.

In FIG. 1 is shown a basic conveyor according to the invention. The conveyor consists of a number of shafts 1 arranged beside each other and turnable together in synchronism, each shaft being equipped with a plurality of cams 2, see FIG. 2. The cams of adjacent shafts are approximately perpendicular to each other. The cams run close to ajdacent shafts and are so distributed on the shafts that the cams of one shaft do not hinder the free turning of the cams of adjacent shafts.

Figure 2:
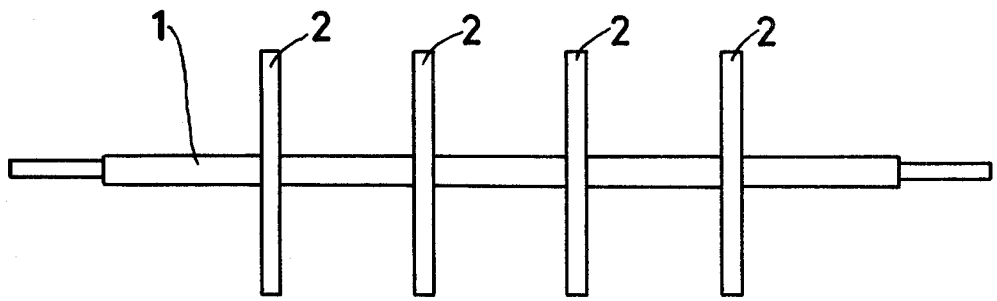
FIG. 2 is a top view of a shaft of the conveyor of FIG. 1.

The top portion of FIG. 1 shows two logs of wood $S_1$ and $S_2$ on a straight conveyor. By the clockwise turning of the shafts 1 in synchronism, the logs $S_1$ and $S_2$ will be moved to the next "section" upon a quarter of a complete turn by the shafts 1. This is easily understood from the different movement sequences of the conveyor shown in FIG. 1. When the shafts have made a complete turn, a conveyed object has been moved forward four shaft divisions by the conveyor. In FIG. 2 there is shown a shaft 1 provided with four cams 2, seen from above. It is to be understood that the shape and number of cams of one shaft is determined by the size and shape of the bodies to be handled. When handling logs every shaft is provided with only a few cams, while when handling bulk material such as, e.g. coarse gravel, a greater number of closely spaced cams are provided. By a suitable design of the cam cross-section it is also possible to provide each shaft with one single cam extending along the major part of the shaft. It is thereby possible to handle fine sized material, e.g. sand, as will be discussed below.

In FIGS. 3 and 4 two examples of vertically arranged handling devices according to the invention are shown, each comprising two conveyors $T_1$ and $T_2$. A handling device for vertical conveyance is thereby achieved. As can be understood from FIGS. 3 and 4 the two parallel conveyors are synchronously driven but as indicated by the arrows, in opposite directions. The handling device of FIG. 3 has the horizontally adjacent shafts arranged in a horizontal plane, and the device is well suited for e.g. vertical transport downwards, whereas the handling device of FIG. 2 has a different relationship between the shafts of the two conveyors, this device being well suited for transport in any direction. Said relationship can be arbitrarily chosen.

In FIG. 5 the handling device of FIG. 3 is shown at a later stage of operation, the shafts and cams of the left conveyor $T_1$ having turned 45° further clockwise and the shafts and cams of the right conveyor $T_2$ having turned further counter-clockwise. In a similar way FIG. 6 shows the handling device of FIG. 4, with the shafts and the cams of the conveyor $T_1$ and $T_2$ turned approximately 22.5° further counter-clockwise and clockwise, respectively.

In a horizontally arranged conveyor the handled object will perform an oscillating vertical movement when being conveyed in a horizontal direction, all handled objects moving in the same vertical direction at the same time. If no special arrangements are provided, this oscillating vertical movement reduces the operating efficiency of the conveyor by consuming power. When conveying elongated bodies, e.g. logs, it is possible to use bars as support members, on which the elongated bodies roll or slide during conveyance. Such bars are preferably arranged in parallel with the general conveying direction of the conveyor, and preferably the bars are provided with the bearings of the shafts 1. This is schematically shown in FIG. 7 from which is easily understood that the oscillating vertical movement of the logs $S_1$ and $S_2$ of FIG. 1 is eliminated. When required any number of bars may be provided.

Another arrangement for reducing the power consumption caused by the oscillating vertical movement of the conveyed material is shown in FIG. 8. In that conveyor the shafts are driven in synchronism with each other and the angle between cams 2 of adjacent shafts 1 is constant but not 90°. Provided that the conveyor has a sufficiently large number of shafts 1 and assuming that a large number of objects is being conveyed, then the upward oscillating movement of one of the objects will be balanced by a simultaneous downward movement of another object, whereby the required power for driving the conveyor is reduced.

By momentarily braking the synchronous drive of one or more shafts or parts of shafts of the material handling device it is possible to manipulate the handled material in various ways. In FIG. 9 there is shown an arrangement by which it is possible — during material conveyance — to separate one or more selected units out of the conveyed material. The shaft 1' is provided with a separate transmission means (not shown), which controllably is able to stop the shaft disconnecting it from the synchronous drive of the other shaft and further is able to reconnect the shaft 1' to drive in synchronism with the other shafts 1. If the transmission means stops the shaft 1' when the cams 2' of that shaft are in a vertical position there will be an opening in the conveyor through which opening the handled material will fall down as it successively is being conveyed thereto. When the intended amount of material has left the conveyor, the transmission means is caused to reconnect the shaft 1' to the drive in synchronism with the other shafts 1, and the conveyor reassumes the ordinary conveying action. The material handling device according to the invention is also able to function as a picking-up conveyor, as shown in FIG. 10. This handling device has the shape and the synchronous movement corresponding to that shown in FIG. 1, see the arrows $R_1$. When picking up an object, e.g. a log $S_3$, the direction of rotation of the cam shaft 1' is reversed at that moment, when the object and the cams of the conveyor have got the positions shown in the top part of FIG. 10. The angular velocity in the reversed direction of rotation $R_2$ is the same as in the direction of rotation $R_1$, whereby the cams 2' get the position shown in the middle part of FIG. 10, when the cams have turned 45°. After another 45° turn of the cams 2' and the cams of the conveyor (in opposite direction) the object is pickup up by the conveyor and the cams 2' return momentarily to the previous speed and direction of rotation $R_1$, whereby the log $S_3$ will be conveyed away.

This reversal of the direction of rotation at certain times with the same speed in relation to the conveyor can be achieved in a simple way by means of a differential gear controlled in a suitable way or by means of other transmission means. The shape of such a control mechanism does not need a more detailed description here.

According to the invention there are other arrangements in which the synchronous drive of one or more shafts or parts of shafts are broken. In all handling of material there are intermittent actions. These may be due to break-downs or may be inherent in the manufacturing process. Thus, it is desirable to arrange buffer stores between various steps in the manufacturing process. Such a buffer store conveyor is easily obtainable by providing all its shafts with separately controllable transmission means, the forward conveying action of the separate shafts being automatically controlled by a control unit, the input signals of which are derived from sensing the presence or absence of a handled object (e.g. a log) in each space between two adjacent shafts. In a manner known in the art the control unit is programmed to control all the shafts in such a way that every shaft keeps conveying only as long as there exists an empty space between any two adjacent shafts further down the buffer store in the conveying direction. Thus, this buffer conveyor builds up a buffer store having one handled object between any two adjacent shafts of the conveyor. The receiving manufacturing station controls its own supply of material by controlling the movement of the output end of the buffer store conveyor, which end has got all its spaces filled with objects handled.

Another embodiment of the material handling device of this invention is the automatic single piece feeder shown in FIG. 11, where as an example boards of wood are fed. The material handling device is separated into one fore conveyor $T_8$ and one rear conveyor $T_9$, the first shaft 1" of which has got cams 2" with the ends tip-shaped in the direction of rotation. The conveyor $T_8$ has got a somewhat higher position than the conveyor $T_9$. Between the conveyors $T_8$ and $T_9$ there are fixed mounted cam-discs 17, which are inserted between the cams 2 and 2" of the conveyors and mounted in such a way, that the upper circular rim has got a common center line of the nearest shaft 1" of the conveyor $T_9$. The radius of the circular rim of the discs 17 is so selected that the cams 2" pass slightly above the rim up to an amount not exceeding the thickness of the thinnest board of the material handled.

The single piece feeder works in the following way. The rear conveyor $T_9$ runs with a constant speed and the front conveyor $T_8$ runs in synchronism with this as long as the photocells 18 are lighted. If the photocells are shadowed, the conveyor $T_8$ stops immediately in the position shown. The shadowing of the photocells 18 indicates that material has entered the pocket which is formed by the last cam shaft of the conveyor $T_8$ and the cam discs 17. The conveyor $T_9$ continues its movement. Through this shape at least one board 16 is forced to follow the cam tip and it is delivered to the conveyor $T_9$. The sequence continues once each half turn of the conveyor until the photocells become lighted again and the conveyor $T_8$ starts, whereupon the sequence is repeated. The single piece feeder might in some cases deliver more than one board. By arranging two equal consecutive feeders of the kind described the probability for the delivery of more than one unit at a time becomes very small. Full security may in most cases be achieved if three consecutive feeders are arranged.

In some instances, e.g. when handling elongated bodies by means of the embodiments shown in FIGS. 9, 10 and 11, it is essential that the elongated bodies are parallel with the shafts 1. The conveyor of FIG. 1 is by its means of operation able to straighten and arrange the conveyed logs automatically in such a way that they put themselves right across the direction of movement in parallel with the shafts 1. Thus, if the angular difference of the dropping bodies in relation to the wanted direction is not considerable and does not noticeably exceed the angle constituted by the diagonal of the handling device "sections," the continuous profile alteration of the handling device will straighten up the body and put it down into a conveyor section. This assumes that the objects handled and the division of the cams are selected with the transverse dimension of the conveyed logs taken into consideration. If the angular deviation is greater a straightening up device is required. In FIG. 12 there is shown an elongated body 4, which "rides" on the tips of the cams 2 of a conveyor. Such riding occurs when the angular difference is so great that the body does not drop down into one "section" of the conveyor. Resting on the tips of the cams 2 the body 4 is, however, fed forward by the conveyor, the limiting upper surface of which varies in height with the turning of the shafts 1. In FIG. 12 there is shown a fixed mounted tipped plate or profile metal bar 3, which extends across the handling device. The tip of the bar 3 is situated at the height level and in the position, where the cams 2 have got their lowest height and right between a pair of adjacent shafts 1. When the handling device works, the riding body 4 is fed towards the slanting stop bar 3. When the tips of the cams 2 are elevated, the body 4 will "climb" the slanting stop 3. After the cam tips have reached their highest level, they descend again and the body 4 will then be hanging between two support points, one upon the slanting stop 3, the other one somewhere along the conveyor. The climbing action will continue with the cyclic feeding of the handling device until the body cannot stay in its position any longer but falls back. The fall necessarily involves also a turning of the body 4, such that the angular difference between the body 4 and the direction of the shafts will be diminished. If a complete straightening up is achieved the first time the process is completed, the body falls down into one of the sections and it is able to pass the stop 3. In other cases the process will be repeated until satisfactory result is achieved. There is no manual interference needed at all.

By adding a further conveyor $T_3$ to the two conveyors $T_1$ and $T_2$ of FIG. 4, an arrangement is obtained having two transport channels in which objects are conveyed in opposite directions, see FIG. 13. It is easily understood that any number of conveyors may be arranged in a similar manner, whereby it is possible to build a store of any desired capacity and shaped. Wherever required separately controllable shafts are provided (e.g. for input to and output from the store), the input and output of objects as well as any moving of objects within the store preferably being controlled by a computer.

In FIG. 14 there is shown a junction between four conveyors $T_4$, $T_5$, $T_6$, $T_7$. The conveyor $T_4$ is conveying handled objects in a direction towards the junction, and the conveyors $T_5$, $T_6$, $T_7$, are conveying objects away from a junction. All shafts of the conveyors $T_4$, $T_5$, $T_6$, $T_7$ have the same angular velocity and the directions of rotation which give the general conveying directions stated above. Three shafts A, B, C are separately controllable. The objects conveyed to the junction on the conveyor $T_4$ may be directed onto any of the conveyors $T_5$, $T_6$, $T_7$, as described below. If the shaft A is connected to rotate in synchronism with the conveyor $T_4$ with the correct angular relationship and if shafts B and C in a similar way are connected to conveyor $T_6$, the object arriving into the junction from the conveyor $T_4$ will be conveyed downwards in the conveyor $T_6$. If shaft B is connected to rotate in synchronism with conveyor $T_7$, the shafts A and C keeping their state of rotation, the objects will be conveyed onto conveyor $T_7$. Finally, if shaft A has a moving cycle of 90° in one direction followed by 90° in the opposite direction, shafts B and C are connected to rotate in synchronism with the conveyor $T_5$, and shaft C changes direction of rotation, the objects arriving on conveyor $T_4$ to the junction will be conveyed upwards in conveyor $T_5$.

According to one embodiment of the present invention it is even possible, contrarily to what has been possible previously, to continuously convey through angular deviation elongated objects in their crosswise direction. In FIG. 15 there is shown from above a conveyor, the shafts of which are disposed in the same plane and form such an angle to each other, that their hypothetical elongations intersect each other in a common point (center of curvature). Thus, the distance between two adjacent shafts increase towards the outer end of the conveyor. The length of the cams may be greater in the outer part of the conveyor than in the inner part, and in some cases it is advantageous that the cams form an angle with the respective shaft different from 90°, as shown in FIGS. 15 and 16.

The conveyors of FIGS. 3 and 4 are not restricted to vertical conveyance. In some applications it is desirable to use such close conveyors also for horizontal conveyance. Further, in some applications it is desirable to convey elongated objects, e.g. logs, in an upright position. This is possible e.g. by means of the combination of a conveyor similar to that of FIG. 4 and an ordinary band conveyor, which is supporting the bottom end of each log during conveyance. Still further a closed conveyor according to the invention may have any general straight, bent or twisted direction of conveyance, e.g. for conveying logs from a lying horizontal position to an upright vertical position.

The conveyor may also be bendable or hinged. As shown in FIG. 17 the conveyor paths are divided into partial paths $T_{1'}$, $T_{1''}$ and $T_{2'}$, $T_{2''}$, respectively. The paths $T_{1'}$ and $T_{1''}$ are movably journalled in bearings at the conveyor shaft $1'$, the paths $T_{2'}$ and $T_{2''}$ being connected by movable link members 3 between two shafts $1''$, said link members 3 being movably journalled in bearings at the respective shaft $1''$ and further journalled in bearings at a short connecting shaft 4. On the shafts $1''$ and 4 cog wheels are mounted, which mesh with each other, see FIG. 17. By this arrangement the synchronous shaft movement can be transmitted from one partial path to the other, and thereby the conveying direction of the conveyor can be modified freely also during conveying action. In a similar way it is also possible to arrange the conveyor to be twistable or turnable.

The number and shape of the cams 2 and their position along the shaft 1, c.f. FIG. 2 may be varied in many different ways depending on the handling intended and character of handled material. The cams 2 may be longer on one side of the shaft than on the other side, they may have various cross-sections, they may have shortened cams leaving openings for smaller objects, etc. Only one example is elucidated below. When handling bulk material with varying size and shape of the individual objects, the conveyor must be tight. In FIG. 18 there is shown a schematical operation sequence of a bulk material conveyor, the cams 2 extending along the whole shaft 1 on both its sides. Thus, each shaft 1 with cams 2 constitute a solid cam shaft, the cross-section of which is shaped in such a manner that the edge of the cams 2 of one shaft always runs in tight adherence to the envelope surface of the cams 2 of the adjacent shaft of the respective one of the two conveyor paths. The distance between the two conveyor paths is chosen in such a manner, that permanently closed cavities are formed, which cavities are transported along the conveyor by its movement. This is achieved by causing the respective cams 2 of one conveyor path to adhere to the corresponding cams of the other conveyor path in a predetermined manner. This control is obtained by choosing the phase relationship between the cams of the two paths e.g. as shown in FIG. 18 a, in which the cams of the right path in the operating position shown form an angle of 45° with the direction of conveyance, the cams of the left path deviating 3° from parallel and right angle position, respectively, with reference to the direction of conveyance.

During operation of the conveyor, the above-mentioned adherence implies that the linear angular movement of at least one conveyor path must be phase modulated by an oscillating angular movement. The swing F of the oscillation amounts to a few angular degrees, and its periodicity corresponds to 45° linear angular movement of the conveyor shaft. In FIG. 18 b – 18 f there is shown five different positions during one period of oscillation, whereby FIG. 18 i d corresponds to the maximum phase deviation of this example.

The modulation of the angular movement of the shafts may be obtained in various ways. A simple way is to introduce a resilient "play" in the coupling between the power source and one of the conveyor paths, the left one in FIG. 18. Thereby the cams of the shafts in the right path will impart the desired modulation upon the shafts of the left path, the cavities of the conveyor certainly being kept permanently closed.

When feeding bulk material into the conveyor there may be problems if particles are stuck between the cams of the two lowest shafts. Such problems are suitably eliminated by providing the lowest cam shaft in the left path with a resilient play, or by controlling said cam shaft in such a manner, that it can yield a number of degrees with reference to its normal rotation in synchronism with the other shafts in the same path.

The tight conveyor is suitable for conveying gravel, wood chips and other bulk material. By introducing sealing means it is also capable of conveying liquids and jelly products, one feature being that it permanently prevents a conveyed material from sticking onto the moving parts of the conveyor. When hoisting liquids and jelly products it is easily understood that the requirement on the pressure resistance of the sealing means is low. Every enclosed quantity can only cause a small internal pressure.

In FIG. 19 there is shown schematically a bulk material conveyor, which simultaneously performs a digging action. The conveyor general outlines are similar to those of FIG. 18, and the cam shafts in the left path scrape soil loose and convey the loose soil downwards to the lower end of the conveyor, where the soil is fed in between the two paths and conveyed upwards. As the bulk conveyor is moved towards the left in the drawing, it will leave a pit behind. If the conveyor on the other hand is moved downwards, it will dig a hole and simultaneously convey the excavated material away.

The invention is not restricted to the examples given above. Within the scope of the claims various modifications are possible.

I claim:

1. An arrangement for the handling of solid bodies, and particularly for the conveyance of solid bodies from one point to another, comprising in combination:
   (a) a plurality of rotary shafts arranged in a straight row so that the axes of said shafts are substantially parallel to each other,
   (b) two rows of parallel finger-like members attached to opposite sides of said rotary shafts, each finger-like member of each row of finger-like members projecting outwardly at right angles from said rotary shaft, the two rows of finger-like members associated with each rotary shaft lying in a plane which is transverse to the axis of rotation of that rotary shaft,
   (c) the distance between adjacent rotary shafts being greater than the length of the finger-like members in a row set forth in (b) but less than double the length of the finger-like members of a row as set forth in (b),
   (d) the lateral space between the finger-like members of a row on each rotary shaft being unobstructed so that the finger-like members of the row of finger-like members on the next adjacent rotary shaft can pass through such unobstructed space,
   (e) means to rotate all of said rotary shafts and in such a manner that the rows of finger-like members will form a continuous support for solid bodies and so that a solid body placed directly upon the row of finger-like members attached to one rotary shaft will be caused to progressively move laterally onto the row of finger-like members of the next adjacent rotary shaft, and
   (f) means to at least intermittently interrupt the drive means of at least one of said rotary shafts so that the row of finger-like members on the interrupted rotary shaft will thereafter no longer support a solid body and the solid body will thereby fall beneath the plane of said plurality of rotary shafts.

* * * * *